US006527980B1

(12) United States Patent
Roden et al.

(10) Patent No.: US 6,527,980 B1
(45) Date of Patent: Mar. 4, 2003

(54) REFORMING WITH INTERMEDIATE REACTANT INJECTION

(75) Inventors: Thomas Michael Roden, Center Valley, PA (US); Arthur Daniel Bixler, Slatington, PA (US); David Michael Nicholas, Madison, MS (US); Shankar Nataraj, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 121 days.

(21) Appl. No.: 09/689,454

(22) Filed: Oct. 12, 2000

(51) Int. Cl.$^7$ .............................. C07C 1/02; C01B 3/26
(52) U.S. Cl. .................... 252/373; 423/650; 423/652
(58) Field of Search .................... 252/373; 423/650, 423/651, 652

(56) References Cited

U.S. PATENT DOCUMENTS 5,769,165 A * 6/1998 Bross et al. ................ 166/266

* cited by examiner

*Primary Examiner*—Wayne A. Langel
*Assistant Examiner*—Jonas N. Strickland
(74) *Attorney, Agent, or Firm*—Mary E. Bongiorno

(57) ABSTRACT

According to the present invention, hydrogen/carbon monoxide synthesis gas (also called syngas) is produced by injection of a second reactant stream into a hydrocarbon reformer at a location between the entry and discharge ends of the reformer. The second reactant stream can contain: carbon dioxide; a mixture of carbon dioxide and hydrocarbon; a mixture of hydrocarbon and steam, a mixture of carbon dioxide and steam; or a mixture of carbon dioxide with hydrocarbon and steam. All or part of the mixtures containing hydrocarbon and steam can be prereformed hydrocarbon in steam.

14 Claims, 3 Drawing Sheets

REFORMING WITH INTERMEDIATE REACTANT INJECTION

CROSS REFERENCE TO RELATED APPLICATIONS

Not Applicable

BACKGROUND OF THE INVENTION

Carbon monoxide can be produced by reforming hydrocarbon feed with steam and carbon dioxide at high temperatures. The reaction can occur in a steam methane reformer (SMR) which contains catalyst-filled tubes housed in a furnace. The synthesis gas (also called syngas) exiting the reformer contains carbon monoxide along with hydrogen, carbon dioxide, steam and unconverted methane according to the equilibrium established from the following reactions:

| | |
|---|---|
| $CH_4 + H_2O \longleftrightarrow 3H_2 + CO$ | Steam Reforming |
| $H_2O + CO \longleftrightarrow H_2 + CO_2$ | Water Gas Shift |
| $CH_4 + CO_2 \longleftrightarrow 2H_2 + 2CO$ | Carbon Dioxide Reforming |

The synthesis gas is cooled and separated into various products, i.e., carbon monoxide or syngas of different hydrogen to carbon monoxide ($H_2/CO$) ratios, recycle carbon dioxide, and by-product hydrogen, using separation technologies such as amine absorption, adsorption and/or cryogenic separation.

Carbon monoxide, the principal product of a reformer plant, is used in the manufacture of isocyanates and polycarbonates through phosgene chemistry. Other processes, such as certain oxoalcohol production processes, require a low 1:1 $H_2/CO$ ratio synthesis gas. In SMR, with a natural gas feed and with full carbon dioxide recycle from the process gas only, the lowest $H_2/CO$ ratio obtainable is about 3. Thus, hydrogen is typically produced far in excess of what is required. Some hydrogen can be used to fire the reformer; the remainder must be exported at fuel value. The requirement of finding a fuel home for this excess hydrogen introduces a constraint. Also, using a value-added material such as hydrogen to substitute for readily available fuels is not the most economical choice.

As is well known in the industry, injecting carbon dioxide into the reformer hydrocarbon feed very effectively reduces the $H_2/CO$ ratio towards what is required. Besides recycling carbon dioxide separated from the synthesis gas product, additional carbon dioxide can be obtained from the furnace flue gas or imported into the plant from an outside source. Under conditions of complete $CO_2$ recycle, the reformer steam to carbon (S/C) ratio is irrelevant in the determination of the $H_2/CO$ ratio. However, it determines the amount of carbon dioxide recycled from the process gas. The combination of recycled carbon dioxide and imported carbon dioxide yields the reformer carbon dioxide to carbon ($CO_2/C$) ratio. For a given $H_2/CO$ ratio there is an infinite combination of the reformer S/C and $CO_2/C$ ratios. Table 1 illustrates this for a particular case in which $H_2/CO=0.6$, pressure=200 psia (1379 kPa), and temperature=1750° F. (955° C.).

TABLE 1

PRODUCTION OF $H_2/CO$ (0.6) AT 200 PSIA AND 1750° F.

| S/C | $CO_2/C$ | BOUDOUARD CARBON K-RATIO* (MINIMUM) |
|---|---|---|
| 1.00 | 3.11 | 0.587 |
| 2.00 | 4.19 | 0.979 |
| 2.31 | 4.53 | 1.096 |
| 2.60 | 4.84 | 1.205 |

*Boudouard Carbon K-Ratio = K-operating/K-equilibrium

As the S/C is lowered, a lower $CO_2/C$ ratio is required to produce the specified syngas $H_2/CO$ ratio. With lower S/C and $CO_2/C$, process steam requirement and carbon dioxide recycle are reduced, and methane leakage increases. Producing steam and recycling carbon dioxide are expensive in energy, capital, and power. Hence it is desirable to operate the reformer at the lowest permissible S/C ratio, consistent with a tolerable methane leakage. However, low S/C operation increases the potential of depositing carbon on the reforming catalyst. Carbon deposition deactivates the catalyst resulting in high reactor tubewall temperature and reduced hydrocarbon conversion. It can also block the reformer tubes resulting in high pressure drops inside the reactor. Several carbon formation mechanisms can be involved:

| | |
|---|---|
| $CH_4 \longleftrightarrow C + 2H_2$ | Methane Cracking |
| $2CO \longleftrightarrow C + 2CO_2$ | Boudouard Reaction |
| $H_2 + CO \longleftrightarrow C + H_2O$ | Reverse of Steam Carbon Reaction |

Conventional steam methane reformer conditions are limited to the point of incipient carbon deposition predicted by the carbon forming reaction equilibria. At every temperature between the reformer inlet and outlet, an equilibrated gas composition can be calculated for the given feed stoichiometry. The reaction equilibrium constant for any of the carbon forming reactions can be calculated (K-operating), and compared with the critical value for depositing carbon via that reaction mechanism (K-equilibrium). The K-operating/K-equilibrium ratio should exceed 1 everywhere in the reformer. The minimum value of this ratio as computed for the Boudouard reaction is shown in Table 1. The table shows that in the production of synthesis gas having $H_2/CO$ ratio of 0.6, the minimum desirable S/C is about 2.31, which gives a narrow operating margin away from conditions where carbon forms. S/C ratios of 1 and 2 are unacceptable because the operating Boudouard K-value is less than the equilibrium value for this reaction and the Boudouard reaction will proceed to the right hand side of the chemical equation as written above, resulting in carbon deposition. The necessity of operating above an S/C of 2.3 implies a $CO_2/C$ greater than 4.5. The resulting huge carbon dioxide recycle would be accompanied by unacceptably high costs.

It is thus highly desirable to develop a process that produces syngas with a $H_2/CO$ ratio of 1 or lower and reduces the S/C ratio, yet avoids carbon formation. Such a process would have the following advantages:

reduced costs associated with the recovery and recompression of carbon dioxide;
 reduced costs associated with steam generation;
 reduced flows, sizes, and duties of all heat exchangers, including the firebox; and greater energy efficiency in operation of the plant.

U.S. Pat. No. 4,782,096 (Banquy, 1988) and U.S. Pat. No. 4,888,130 (Banquy, 1989) disclose processes for producing a synthesis gas having a $H_2/CO$ ratio below 2.5. In the processes a hydrocarbon feed is split into two parts. A portion is reformed in a primary reformer at high temperature and pressure. The effluent is combined with the remainder of feed and undergoes a secondary reforming reaction in an adiabatic reactor by reacting with an oxygen rich stream. The overall S/C is very low; e.g., 0.4 in one example. Carbon deposition is reportedly avoided by maintaining the combined feed to the second (autothermal) reformer above a minimum temperature (e.g., 1100° F. or 594° C.), and by designing burners with high mixing efficiency. However, the process of U.S. Pat. No. 4,888,130, as shown in the examples, achieves syngas $H_2/CO$ ratios greater than 1.5. Also, the process needs expensive oxygen feedstock.

Syngas $H_2/CO$ ratios of less than 2 can be achieved using autothermal reforming. Carbon formation is avoided by using well mixed burners. With full recycle of carbon dioxide, the minimum syngas $H_2/CO$ achievable is 1.6. This ratio can be lowered further with imported carbon dioxide. However, autothermal reactors require pure oxygen, and unless inexpensive oxygen is available, they are not economical in comparison with fired reformers. In addition, the oxygen consumption goes up with the amount of carbon dioxide or water recycled or imported into the feed, as necessitated by lower and lower $H_2/CO$ ratios. Air cannot be used as an oxidant source because the products will be contaminated with nitrogen which is difficult to remove from a hydrogen-carbon monoxide syngas or carbon monoxide product. Also, elaborate safety and shutdown systems are required to handle hot oxygen in the presence of fuel.

U.S. Pat. No. 2,199,475 (Wilcox, 1940) discloses the addition of a controlled amount of carbon dioxide to hydrocarbon gases and steam prior to introduction into the dissociation chamber of a reactor. Oxygen can be added, preferably at an intermediate point in the dissociation chamber. The oxygen is fully consumed in partial combustion of unreformed methane (and hydrogen and carbon monoxide). Temperatures in excess of 2000° F. are thereby reached where the reforming and reverse shifting occur without a catalyst. The resulting equilibrium favors methane extinction and reverse shift towards lower $H_2/CO$ ratios. The example in the patent produces a syngas $H_2/CO$ ratio of 2. The same penalties as discussed above with autothermal reformer apply here, with regard to oxygen consumption and oxygen safety. Additionally, the process requires two separate reactors.

U.S. Pat. No. 3,723,344 (Reynolds, 1973) and U.S. Pat. No. 3,919,113 (Reynolds, 1975) disclose a process for producing oxo-synthesis gas by partial oxidation of a hydrocarbon fuel with oxygen, splitting the effluent into two parts, shifting one part to a higher $H_2/CO$ ratio, and simultaneously reverse shifting the other part to a lower $H_2/CO$ ratio. Carbon is formed, and scrubbed off. This is feasible and practical since the entire process is non-catalytic. The forward-shifted syngas is stripped of carbon dioxide which is compressed to feed the reverse shift reaction. Thus the process maintains an overall high $H_2/CO$ ratio. The process uses at least 3 reactors, plus carbon removal systems. In addition, there are oxygen consumption and safety issues.

The oxygen penalty is circumvented by the process disclosed in U.S. Pat. No. 1,903,845 (Wilcox, 1933) in which the following steps are carried out in a refractory filled bed: burning fuel in air in order to heat the bed; purging the bed with methane; and introducing methane, carbon dioxide and steam at one end of the hot bed where reforming occurs and cools the bed. The major drawback of this process is the requirement for two parallel trains for quasi-continuous operation.

U.S. Pat. No. 3,103,423 (Pearce, 1963) and GB 2,015,027 A (1979) disclose that injecting small quantities (2 ppm) of hydrogen sulfide into a hydrocarbon feed can lead to carbon-free reforming, under conditions that otherwise cause severe carbon deposition. The sulfur passivates the reforming catalyst allowing for low steam to carbon feed ratios without carbon formation problems. This concept has been commercialized in what is referred to in the industry as the SPARG process.

U.S. Pat. No. 3,859,230 (Moe, 1975) discloses a process for production of synthesis gas in which a naphtha and steam mixture is passed through a first reforming zone to produce an effluent containing methane, steam, hydrogen, and carbon dioxide. The effluent from the first reforming zone is divided in a major and a minor portion. Carbon dioxide is separated from the minor portion and then combined with the major portion prior to passing the major portion through a second reforming zone. The process is reported to increase the carbon monoxide content relative to hydrogen in the synthesis gas product.

DE 2,711,991 A1 (1978) discloses a process for producing synthesis gas with high carbon monoxide content by reacting a mixture of hydrocarbons and carbon dioxide in a tubular furnace reformer. Carbon dioxide feed is obtained, in part, by separating it from the furnace flue gases.

DE 3,501,459 C2 (1991) discloses a process for producing a $H_2/CO$ synthesis gas and a pure CO fraction. In the process, hydrocarbons are converted into reformed gas in the presence of carbon dioxide as the oxygen supplying component. Carbon dioxide is recycled after removal from the reformed gas.

GB 2,170,508 A (1986) discloses a method for producing a stoichiometric hydrogen/carbon monoxide gas by catalytically converting a hydrocarbon stream, in the presence of carbon dioxide, by endothermic catalytic oxidation. It is reported that a syngas having $H_2/CO$ ratios from about 0.3 to 2.3 can be obtained by using feedstocks having $CO_2/C$ ratios of about 0.3 to 5 and $H_2O/C$ ratios of about 0 to 5.

BRIEF SUMMARY OF THE INVENTION

According to the present invention, hydrogen/carbon monoxide synthesis gas (also called syngas) is produced by injection of a second reactant stream into a hydrocarbon steam reformer at a location between the entry and discharge ends of the reformer. The second reactant stream can comprise one of the following reactants:

carbon dioxide;

a mixture of carbon dioxide and hydrocarbon;

a mixture of hydrocarbon and steam, a mixture of carbon dioxide and steam; or a mixture of carbon dioxide with hydrocarbon and steam, wherein all or part of the mixtures containing hydrocarbon and steam can be prereformed hydrocarbon in steam.

In the process of this invention a first reactant stream comprises a hydrocarbon feed, typically natural gas, that is heated, desulfurized, and mixed with steam so that the ratio of steam to carbon (S/C) ranges from 1 to less than 3. The hydrocarbon/steam mixture is then further heated, optionally prereformed and reheated, and passed through a reformer.

The second reactant stream is heated and injected into the reformer at an intermediate point between the entry and discharge ends of the reformer. The quantity of reactant in the second reactant stream is controlled to produce a reformer effluent with a ratio of hydrogen to carbon monoxide ($H_2/CO$) ranging from about 0.6 to less than 3.

Hydrocarbons in the first and second reactant streams are prereformed, if necessary, to reduce the hydrocarbons heavier than methane.

One embodiment of the present invention comprises the steps of:

heating and mixing a desulfurized hydrocarbon feed with steam;

prereforming the hydrocarbon/steam feed, if necessary, to reduce the amount of hydrocarbons heavier than methane;

introducing the heated hydrocarbon/steam mixture into catalyst tubes contained in a reformer heated to operating temperature;

introducing a second reactant stream, as described above, into the reformer at a location between an entry end and a discharge end; and adjusting the quantity of reactant in the second reactant stream to produce a reactor effluent with a ratio of $H_2/CO$ ranging from about 0.6 to less than 3.

According to the present invention, when the second reactant stream is a mixture of steam and hydrocarbon, the S/C ratio in the injected mixture is lower than the S/C ratio in the first reactant stream.

In another embodiment of the present invention, the S/C ratio in the mixed hydrocarbon and steam feed can be about 1.4. It is heated to about 1000° F. (538° C.) before entering the reformer. Carbon dioxide, the second reactant stream, is heated and injected into the reformer at a temperature of 1450° F. (788° C.) to 1550° F. (844° C). A product syngas having $H_2/CO$ ratio ranging from 0.6 to 1 can be achieved.

Intermediate injection of a second reactant stream provides the following advantages:

a syngas effluent having a low $H_2/CO$ ratio can be produced; and substantially no carbon deposition occurs during the reforming process.

DETAILED DESCRIPTION OF THE INVENTION

Figure 1:
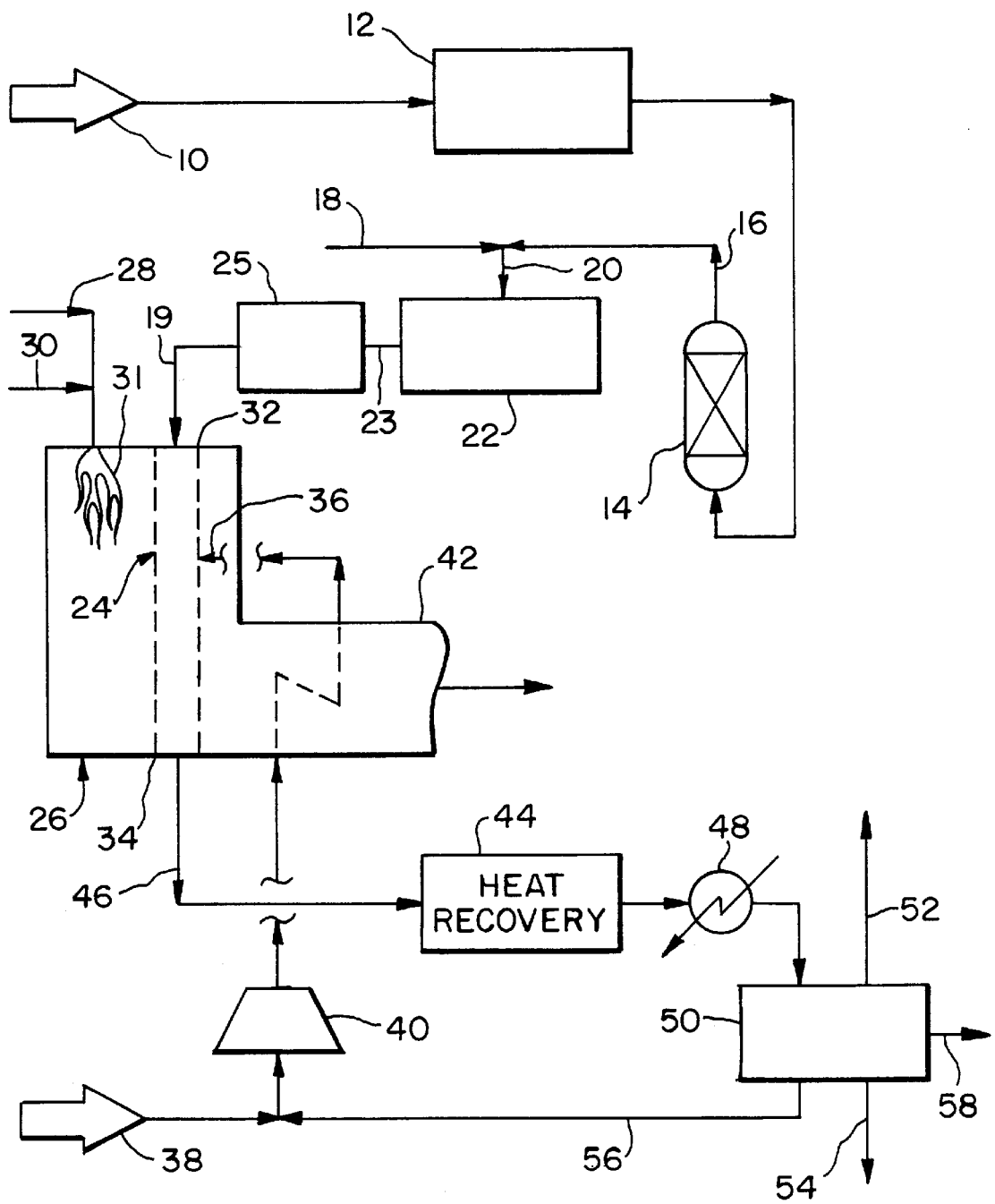
FIG. 1 is a flow diagram of a process for producing synthesis gas according to the present invention.

In the process of this invention, hydrocarbon feed, typically natural gas, is preheated to about 500° F. (260° C.) to about 800° F. (427° C.), preferably 650 (344° C.) to 750° F. (399° C.). Other examples of other appropriate hydrocarbon feeds are associated gas, naphtha, and LPG.

Some hydrogen is optionally mixed with the hydrocarbon feed in a molar ratio of 0.1%–10%, and fed into a bed filled with hydrogenation catalyst (e.g., Co—Mo or Ni—Mo), to convert olefins that may be present into paraffins, and organic sulfur into hydrogen sulfide.

The hydrocarbon feed is then fed into a bed of a sulfur sorbent such as zinc oxide. Hydrogenation and desulfurization of such gas streams is a well-established practice in the steam reforming industry, and the catalysts are commercially available. Sulfur should be reduced to about 50 ppb, since sulfur poisons most reforming catalysts downstream. Zinc oxide is the preferred sorbent especially for hydrogen sulfide since it has reduced capacity for organic sulfur. Hence, organic sulfur like mercaptans are preferably hydrogenated prior to the zinc oxide bed. Simultaneously, olefins are also converted to paraffins; otherwise olefins have a propensity to crack during further heating in downstream equipment.

The desulfurized hydrocarbon feed is mixed with steam at a S/C ratio ranging from 1 to 3, preferably 1 to 2, and then further preheated to 500° F. (260° C.) to 1200° F. (649° C.). The steam-hydrocarbon mixture is fed to an adiabatic prereformer, if needed, to reduce the amount of hydrocarbon heavier than methane to less than about 500 ppm, preferably less than 100 ppm. The prereformer is a vessel filled with a catalyst that is active for steam reforming of hydrocarbons at these low temperatures. Many such catalysts are commercially available; for example, the high nickel CRG catalyst marketed by SYNETIX. The key function of the prereformer is to reduce the concentration of all hydrocarbons heavier than methane); in addition hydrogen is produced as a product. These two features vastly decrease the danger of carbon deposition in the primary fired reformer under severe conditions.

The hydrocarbon and steam mixture is reheated to a temperature of about 1000° F. (538° C.) to about 1400° F. (760° C.), preferably about 1100° F. (594° C.) to about 1300° F. (705° C.) and then fed to the catalyst tubes in a fired primary reformer. Reformer pressure is at least about 30 psia (207 kPa) and can range from 30 psia (207 kPa) to 600 psia (4137 kPa).

A second reactant stream is introduced into the primary reformer at a location between the inlet and the outlet of the reformer and can contain carbon dioxide; a mixture of carbon dioxide and hydrocarbon; a mixture of hydrocarbon and steam; a mixture of carbon dioxide and steam; or a mixture of carbon dioxide with hydrocarbon and steam. All or part of the mixtures containing hydrocarbon and steam can be prereformed hydrocarbon in steam. The second reactant stream is preheated by process gas and/or in the furnace convection section to a temperature of about 1450° F. (788° C.) to about 1652° F. (900° C.)

Imported and recycled carbon dioxide can be used in the second reactant stream. The hot second reactant stream is transferred to internal injection tubes and mixed with the partially reformed gas at process temperatures ranging from about 1300° F. (705° C.) to about 1550° F. (844° C.). The temperature is such that the Boudouard reaction will not cause carbon deposition when the second reactant stream mixes with the reforming gas.

Reforming progresses in the remainder of the tubes to an outlet temperature of at least 1500° F. (816° C.); preferably, 1650° F. (899° C.) to 1750° F. (955° C.). The reformer effluent is cooled down to the separation train temperature by a variety of methods known and practiced in the industry; for example, superheating steam, making saturated steam, preheating boiler feed water, preheating process reformer feed, preheating process carbon dioxide (recycled or imported) injected into the reformer, and reboiling rich MEA or other carbon dioxide absorbent. Final trim cooling with cold water or a fan cooler followed by water knockout is usually necessary. Occasionally a chiller may be desirable.

FIG. 1 illustrates the modified steam reformer process, with intermediate reactant injection, such as carbon dioxide, of this invention. Referring to FIG. 1, a hydrocarbon feed 10, such as methane or natural gas, is heated in a preheater 12 and then desulfurized in vessel 14. Preheater 12 may be a separate unit or part of the reformer 26. The desulfurized hydrocarbon feed is transferred from the desulfurizer 14 via conduit 16 where it is mixed with steam 18 to form a mixed-reformer feed 20. Mixed reformer feed 20 is heated in preheater 22, may optionally be prereformed in prereformer 25, and introduced into catalyst tubes 24 of reformer 26 via conduit 19. Reformer 26 is heated using a mixture of fuel 28 and air 30 to produce a flame 31. The mixed reformer feed proceeds from an entry end 32 to an exit end 34 of catalyst tubes 24. Reactant 38 is raised to the required pressure via compressor 40 and then heated in preheater 12 or by heat exchange with flue gases exiting through flue gas recovery section 42 of reformer 26 and then injected into reformer 26 at a location between the entry end 32 and the exit end 34 of the catalyst tubes 24 via conduit 36. The preheaters 12 and 22 can also be combined with heat recovery station 44 for heat exchange of the hydrocarbon and steam against the effluent 46 exiting the reformer 26.

In the process of the present invention, the steam and hydrocarbon react in the catalyst tubes 24 to effect partial reformation. Reforming progresses as the mixed feed is conducted down the catalyst tubes and the reformation is completed at exit 34 of the catalyst tubes where the effluent 46 has a temperature of 1650° F. (899°C.) to 1750° F. (955° C.). The effluent 46 from the reformer 26 is conducted to heat recovery station 44 and then through cooling apparatus 48 to separation apparatus 50 where, depending upon the conditions inside the reformer, purge gas 52, which can be used as fuel, condensate 54, carbon dioxide 56, and product synthesis gas (carbon monoxide and hydrogen) 58 are produced. Carbon dioxide can be recycled through compressor 40 for use in the reformer. By adjusting the ratio of carbon dioxide (both import and recycle carbon dioxide) to natural gas feed, the synthesis gas product 58 contains the desired $H_2/CO$ ratio.

Figure 2:
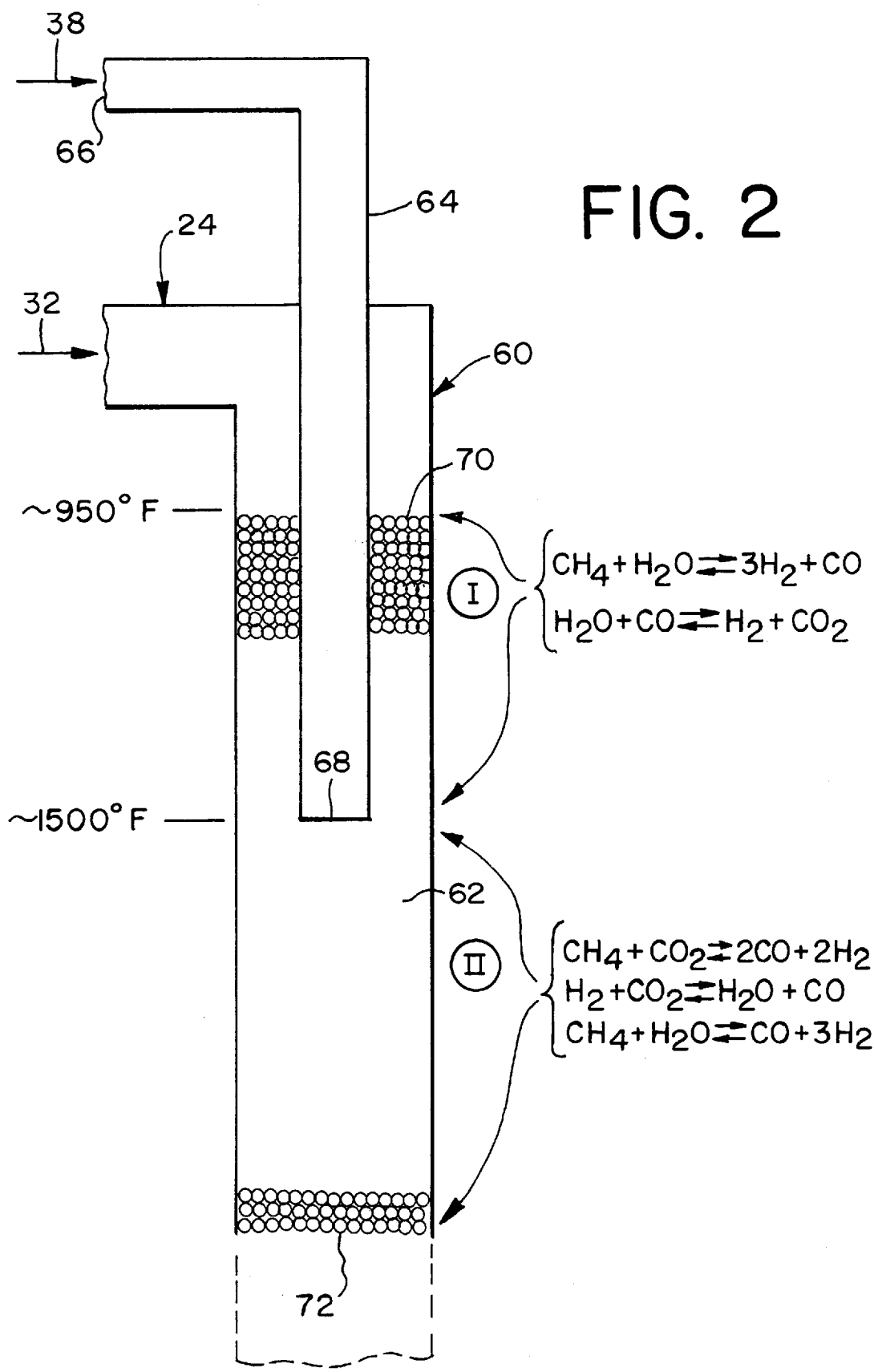
FIG. 2 is a schematic diagram of a catalyst tube in a reformer as an example of one method of practicing the process of the present invention.

FIG. 2 is a schematic representation of one arrangement for practicing intermediate reactant injection. In this arrangement, catalyst tube 60 contains a known reforming catalyst 62. The hydrocarbon and steam mixture enters catalyst tube 60 by way of inlet 32. A reactant tube 64 having an inlet end 66 so that the second reactant stream 38 can be introduced into the catalyst bed terminates in an outlet 68 which is disposed between the top 70 and the bottom 72 of the catalyst bed 62. Typical temperatures of approximately 950° F. (510° C.) at the top of the catalyst bed and approximately 1500° F. (816° C.) at the point of introduction of the reactant are shown. Reactions are shown that take place in the catalyst bed at area I, between the top of the bed 70 and the outlet end of the reactant tube 68, and at area II, between the outlet end of the reactant tube 68 and the bottom of the catalyst bed 72.

If synthesis gas is the desired product, the reformer can be controlled to yield the desired $H_2/CO$ ratio. A carbon dioxide absorption column can be used with any commercial solvent used for carbon dioxide absorption, such as monoethanolamine (MEA), to absorb the carbon dioxide from the process gas. The product gas is substantially free of all impurities except hydrocarbon and possibly nitrogen. The solvent used to absorb the carbon dioxide can be stripped of the carbon dioxide and reused.

If carbon monoxide is the desired product, the reformer can yield a ratio of hydrogen to carbon monoxide in the synthesis gas of about 0.6 to 1. The cooled synthesis gas can feed an MEA absorption tower followed by a Thermal Swing Adsorption unit or a Pressure Swing Adsorption unit which uses a sorbent such as a type 13x molecular sieve to adsorb the carbon dioxide. The unadsorbed effluent, under pressure, is fed to a cold-box which separates the gas into pure carbon monoxide and a fuel gas stream consisting of hydrogen and hydrocarbon, which can be used as furnace fuel.

In addition to using pure carbon dioxide injection, the process of the invention can use one or more of the three reactants in the reforming reaction, via intermediate injection, i.e. hydrocarbon feed, steam and carbon dioxide. The only caveats are that the injected material does not form carbon prior to or subsequent to injection, and it reduces the synthesis gas $H_2/CO$ ratio. Injection of pure carbon dioxide as in the following examples satisfies these criteria. Injection of pure steam would not reduce the $H_2/CO$ ratio and is thus not appropriate for the present invention. Injection of pure hydrocarbon is not appropriate, if it cracks before injection. However, injecting a mixture of carbon dioxide and hydrocarbon that does not form carbon is appropriate. Similarly, injecting a mixture of steam and hydrocarbon at a ratio lower than the other feed can be used because the overall steam to carbon ratio for the reactor would be reduced.

The invention will be further clarified by a consideration of the following example, which is intended to be purely exemplary of the invention. All examples were carried out using thermodynamic calculations.

EXAMPLE 1

This example illustrates why the present invention does not form carbon, while a conventional process forms carbon under almost identical conditions. Pure methane was premixed with steam to obtain an S/C ratio of 1.5 and entered the reformer at 1000° F. (538° C.). The syngas exited the reformer at 1720° F. (938° C.) and 400 psia (2758 kPa). A $CO_2/C$ ratio of 2.0 was found to be necessary to yield synthesis gas with a $H_2/CO$ ratio of 1:1. In the conventional approach, the $CO_2$ was premixed with the feed methane and steam, and entered the reformer catalyst tubes at one end. In the method of the present invention, the same amount of $CO_2$ was injected into the reformer catalyst tubes at a point where the temperature was about 1550° F. (844° C.). The reactor exit conditions were the same in both cases.

Figure 3:
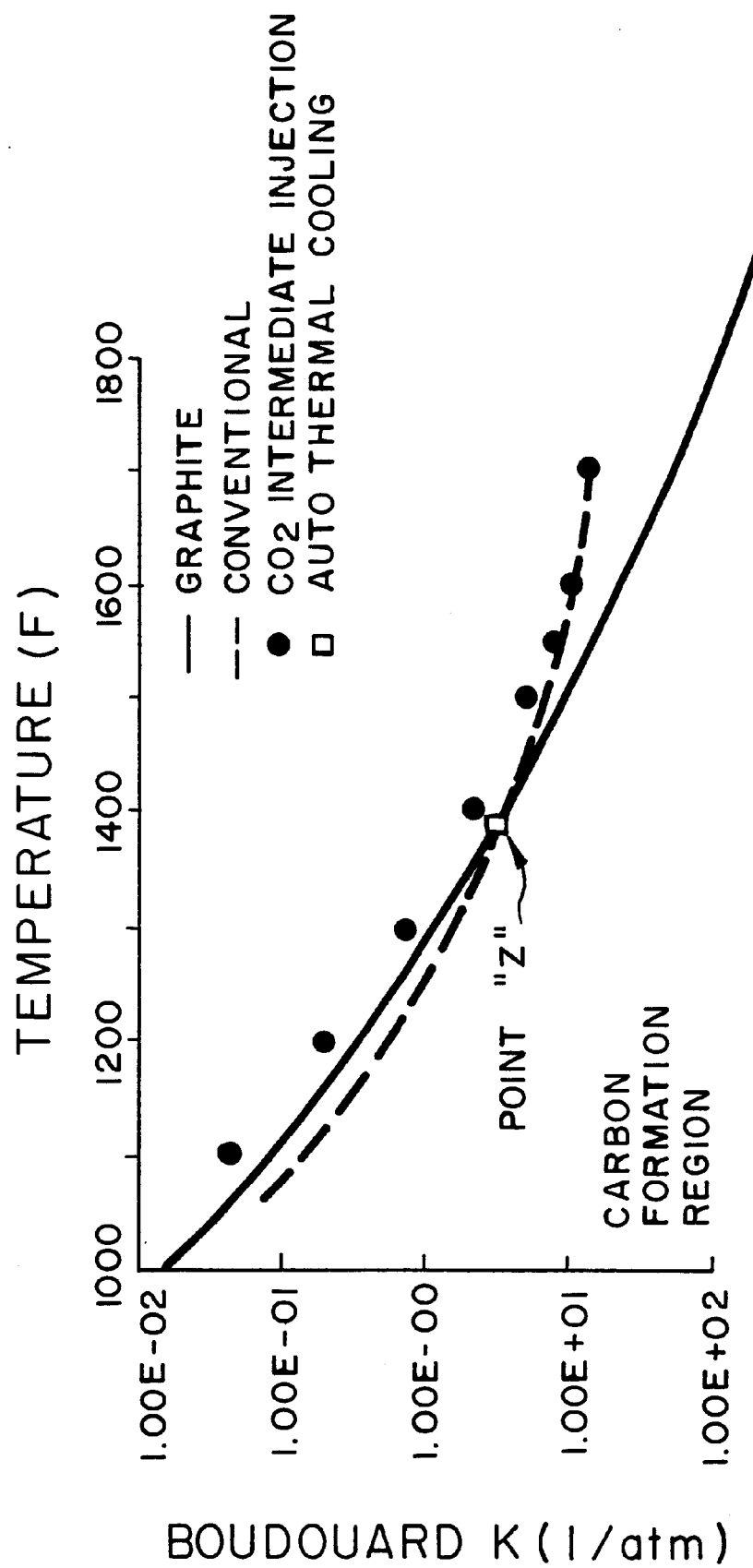
FIG. 3 is a Boudouard Carbon Diagram of Boudouard constant plotted against temperature for a conventional reforming process, equilibrium conditions, and a process according to the invention.

FIG. 3 is a plot of the equilibrium and operating ratios for the Boudouard carbon reaction at temperatures ranging from 1000° F. (538° C.) to 1800° F. (983° C.). The solid line is the equilibrium line for carbon present as graphite. At K-values below the solid line, carbon formation is predicted. The operating K-values at the catalyst site are plotted for both the conventional process and the process of the present invention. It is assumed that the gas composition at the catalyst site is in reforming and shift equilibrium at the operating temperature, and consistent with the feed stoichiometry. Since the conventional operating line is below the equilibrium curve up to 1400° F. (760° C.), carbon formation is predicted in the initial portion of the reactor. However, intermediate carbon dioxide injection avoids the carbon deposition zone in its entirety.

Immediately after carbon dioxide injection, the bulk gas is far from chemical equilibrium. The bulk gas quickly approaches equilibrium but it consumes a large amount of heat. In the extreme case, if no heat can be furnished, the maximum temperature to which the gas can cool due to "autothermal reforming" is 1392° F. (756° C.). The bulk gas temperature profile would not be monotonic as might be implied by FIG. 3. The operating curve (for the invention case) would "backtrack" along the operating curve for the conventional case consistent with the post-injection switch in envelope stoichiometry. In the extreme, adiabatic case, it would backtrack up to the point "Z" indicated in FIG. 3. In practice, it would not backtrack that far, since the process gas is gaining heat from the furnace even as it is reforming. The system can be designed so that the post-injection bulk gas does not cool itself into the carbon deposition zone. This involves a careful specification of the injection temperature, the injectate temperature, and the matching of reforming catalyst activity with heat flux. It may be necessary to use a low-activity catalyst, such as a secondary reforming catalyst, in the immediate vicinity of the injection area. Eventually, the bulk gas heats up and returns along the conventional operating curve past the injection temperature to the exit temperature.

To shift the conventional operating curve out of the carbon zone, the S/C ratio needs to be increased or the $CO_2/C$ ratio needs to be decreased. This will yield a syngas with a $H_2/CO$ ratio greater than 1. To preserve a ratio of 1, both S/C and $CO_2/C$ ratios need to be increased excessively.

EXAMPLE 2

Production of 1:1 SYNGAS

Table 2 summarizes the reformer conditions to yield 1:1 $H_2$:CO Syngas using a Conventional Process or the Intermediate Carbon Dioxide Injection of this invention. Two different typical reforming pressures were arbitrarily chosen; 200 psia (1379 kPa) and 85 psia (586 kPa).

TABLE 2

1:1 SYNGAS PRODUCTION WITH DIFFERENT TECHNOLOGIES

| Technology | Conventional (1) | Intermed. $CO_2$ Injection (1) | Conventional (2) | Intermed. $CO_2$ Injection(2) |
|---|---|---|---|---|
| Reformer Pressure, psia | 200 | 200 | 85 | 85 |
| $H_2$/CO | 1.00 | 1.00 | 1.00 | 1.00 |
| S/C, Envelope | 2.02 | 1.40 | 1.79 | 1.40 |
| $CO_2$/C, Envelope | 2.30 | 1.89 | 2.16 | 1.90 |
| Prereformer? | Yes | Yes | Yes | Yes |
| Reformer Inlet Temp, ° F. | 1100 | 1100 | 1100 | 1100 |
| Reformer Exit Temp, ° F. | 1750 | 1750 | 1750 | 1750 |
| Duty, Btu/mole syngas | 38,009 | 34,235 | 37,051 | 34,541 |
| Moles Reformer Exit Flow/ mole syngas | 1.84 | 1.59 | 1.736 | 1.578 |
| Moles Feed $CO_2$/ mole Syngas | 0.579 | 0.481 | 0.540 | 0.476 |
| Moles Feed NG/ mole Syngas | 0.252 | 0.252 | 0.250 | 0.251 |
| Moles Effluent $CO_2$/ mole Syngas | 0.329 | 0.231 | 0.290 | 0.227 |
| Moles Net $CO_2$ Import/mole Syngas | 0.250 | 0.250 | 0.250 | 0.250 |
| % $CO_2$ dry in Effluent | 24.7 | 18.7 | 22.5 | 18.5 |
| % $CH_4$ dry, $CO_2$ free basis | 0.21 | 0.51 | 0.05 | 0.10 |
| [K3 op/K3 eq] min, Boudouard | 1.13 | 1.43 | 1.13 | 1.40 |

Comparing Conventional (1) to Intermediate $CO_2$ Injection (1), Intermediate $CO_2$ Injection produces 1:1 syngas with a much lower requirement for the combination of $CO_2$/C and S/C. This directly translates into the following tangible benefits:

The amount of carbon dioxide that needs to be stripped off the product syngas is 30% lower, with a corresponding decrease in the size of the carbon dioxide removal system, the energy required to strip carbon dioxide, and the compression capital and power associated with recycling this carbon dioxide.

The reformer process duty is lowered 10%, with a corresponding capital cost reduction of the reformer tubes, firebox and convection section.

There is a 14% reduction in the molar flow rate of the reformer effluent, and the equipment associated with the heat recovery of the process gas is smaller.

The process steam requirement is 30% lower. If the plant is configured to have no steam export (for example by preheating air), the size of the steam system is correspondingly reduced, and the plant becomes more energy efficient.

The last row of Table 2 is the minimum ratio of operating and equilibrium K-values for the Boudouard carbon deposition reaction at reforming and shift equilibrium as previously described for the last column of Table 1. It is a measure of the severity of the reforming condition. Referring to the Boudouard carbon diagram of FIG. 3, it is a measure of the margin above the equilibrium curve and how far the reforming conditions are away from the carbon deposition zone. For conventional technology (1) and (2), the K-ratio was fixed at 1.13, based on commercial experience, and represents the closest successful commercial operation to incipient carbon deposition; it dictates the S/C ratio for conventional technology. For Intermediate $CO_2$ Injection (1), the K-ratio is 1.43, which represents a less severe, and more robust operation.

The superiority of Intermediate $CO_2$ Injection (2) compared to conventional technology (Conventional (2)), is maintained at 85 psia (586 kPa).

EXAMPLE 3

Another modern competing technology is the Sulfur Passivated Reforming Process, particularly as commercialized by Haldor Topsoe under the trade name of SPARG. Data obtained in their monotube pilot unit has been published and is summarized in Table 3.

TABLE 3

SULFUR PASSIVATED REFORMING PUBLISHED DATA*

| | Test | | |
|---|---|---|---|
| | HOU-38 | HOU-39 | HOU-41 |
| $H_2$/CO, vol/vol | 0.89 | 0.92 | 0.72 |
| T, ° C. | 930 | 930 | 945 |
| Pressure, barg | 5.5 | 14.0 | 14.0 |
| S/C | 0.35 | 0.62 | 0.70 |
| $CO_2$/C | 1.55 | 1.66 | 2.43 |
| $H_2$C | 0.11 | 0.14 | 0.18 |
| % $CH_4$ dry, $CO_2$ free basis | 0.97 | 1.95 | 0.75 |
| Temperature Approach Reforming Equilibrium, ° C. | 43.5 | 23.8 | 32.2 |
| Run Duration, hours | 500 | 160 | 400 |

*Taken from: "Sulfur passivated reforming process lowers syngas $H_2$/CO ratio," by Niels R. Udengaard, et al. Oil and Gas Journal, March 9, 1992, pages 62–67.

The "HOU-39" data of Table 3 are used in Table 4 for comparison with the Intermediate $CO_2$ Injection process of this invention. Conditions were adjusted slightly so they matched the SPARG process conditions.

TABLE 4

COMPARISON WITH SPARG PROCESS

|  | Technology | |
|---|---|---|
|  | Intermediate $CO_2$ Injection | Sulfur Passivated Reforming |
| Reformer Pressure, psia | 217.7 | 217.7 |
| $H_2$/CO | 0.92 | 0.92 |
| $H_2$/C, Envelope | 0.14 | 0.14 |
| S/C, Envelope | 1.40 | 0.62 |
| $CO_2$/C, Envelope | 2.31 | 1.66 |
| Reformer Inlet Temp, F. | 1100 | 1100 |
| Reformer Exit Temp, F. | 1706 | 1706 |
| Duty, Btu/mole Syngas | 34,123 | 34,831 |
| Reformer Exit Flow/mole Syngas | 1.674 | 1.37 |
| Moles Feed $CO_2$/mole Syngas | 0.567 | 0.433 |
| Moles Feed NG/mole Syngas | 0.246 | 0.261 |
| Moles Effluent $CO_2$/mole Syngas | 0.287 | 0.152 |
| Moles Net $CO_2$ Import/mole Syngas | 0.280 | 0.281 |
| % $CO_2$ dry in Effluent | 22.3 | 13.0 |
| Temp Approach Reforming Equilibrium (Start of Run) | 0° F. | 43° F. |
| % $CH_4$ dry, $CO_2$ free basis | 0.45 | 1.95 |
| [K3 op/K3 eq] min, Boudouard | 1.53 | 0.478 |

From the last row of Table 4, it is obvious that the SPARG reformer operated within the carbon deposition zone. Carbon formation is kinetically inhibited by controlled poisoning of the catalyst via sulfur injection into the feed. Thus $CO_2$/C and S/C are even lower than the current invention. This lowers the carbon dioxide stripping requirement by 47% compared to Intermediate $CO_2$ Injection technology.

The methane impurity level in the product syngas is much higher with Sulfur Passivation. Two factors contribute to the increased methane leakage—sulfur poisoning of the reforming catalyst, and lower S/C and $CO_2$/C ratios. Methane concentration is very significant for syngas production. The 2% level reported in Table 3 for Sulfur Passivated Reforming would not, in general, meet most user specifications for syngas; however, the 0.5% for Intermediate $CO_2$ Injection would meet most user specifications.

If the specifications were tighter, a demethanator would be required. Such a demethanator could be a cryogenic wash of the syngas with refrigerated propane. The demethanator could be designed for essentially complete removal of methane from the syngas that feeds it; a portion of the syngas could bypass the demethanator such that the blended product gas meets the specification for methane concentration. For example, to meet a 0.3% methane specification, Intermediate $CO_2$ Injection technology would require that 33% of the product syngas be processed in the demethanator. Sulfur Passivated Reforming practiced under the published conditions of Table 3 would require demethanization of 85% of the syngas production. The relative sizes of associated equipment is more than doubled for Sulfur Passivated Reforming.

It is, of course entirely possible to run the Sulfur Passivated Reformer at the envelope conditions of the Intermediate $CO_2$ Injection Reformer. It would not be possible to run the Intermediate $CO_2$ Injection Reformer at the envelope conditions of the Sulfur Passivated Reformer. However, the methane leakage for the Sulfur Passivated Reformer would in general be always higher. This is evident from Table 3, which shows a range of the reforming temperature approach for SPARG at 23–44° C. (41–79° F.) for relatively fresh catalyst (runs of 160, 400, and 500 hr). For unpoisoned reforming catalyst, the temperature approach is essentially zero. The sulfur poisoning decreases from the inlet towards the outlet of the reformer, as the temperature and hydrogen partial pressure increase. The poisoning is also dependent on the relative sulfur amount injected—less severe conditions would presumably benefit from reduced poisoning. Sulfur injection in controlled amounts (1–10 ppm) upstream of the reformer is required. Since the poisoning is reversible, the sulfur has to be removed from the product syngas.

The reforming heat duty is 2% higher for the Sulfur Passivated Reforming (Table 4), because the injected carbon dioxide is preheated to the injection temperature which is 1475° F. for Intermediate $CO_2$ Injection, but 1100° F. (feed temperature) for the Sulfur Passivated Reforming. The natural gas feed requirement is also 6% higher for the Sulfur Passivated Reforming process.

Both the Sulfur Passivated Reforming process and the Intermediate $CO_2$ Injection process would generally require a preconverter (prereformer). The minimum S/C in the prereformer is 0.3 with natural gas, and greater than 1 with heavier feedstocks such as naphtha. Thus with heavier feedstocks, the Intermediate $CO_2$ Injection process can operate with the same S/C, $CO_2$/C and $CO_2$ stripping duties as the Sulfur Passivated Reforming process, but with lower methane leakage.

EXAMPLE 4

Table 5 compares intermediate $CO_2$ injection with conventional technology for the production of 0.6 $H_2$/CO syngas, which will be purified downstream to produce pure carbon monoxide product. For carbon monoxide-only plants, it is desirable to operate the reformer to produce the lowest $H_2$/CO ratio economical when the co-product hydrogen has a low value and cheap carbon dioxide is available. A certain amount of hydrogen can be burned as fuel for the reformer furnace; any additional hydrogen has to be exported as fuel. Also, the additional volume of syngas with a high $H_2$/CO ratio increases the size of all equipment. Further, hydrogen-carbon monoxide separation system may offer benefits with the higher carbon monoxide feed concentrations concomitant with low $H_2$/CO ratio. The 0.6 ratio is an arbitrary, low value chosen with these aspects in mind.

Once again, Intermediate $CO_2$ Injection has been shown to be superior in all respects compared to conventional technology, along the lines discussed for the 1:1 ratio syngas production in Example 2.

TABLE 5

0.6:1 SYNGAS FOR CARBON MONOXIDE PRODUCTION USING DIFFERENT TECHNOLOGIES

|  | Conventional | Intermediate $CO_2$ Injection |
|---|---|---|
| Reformer Pressure, psia | 200 | 200 |
| $H_2$/CO | 0.60 | 0.60 |
| $CO_2$/C | 4.62 | 3.55 |
| S/C | 2.40 | 1.40 |
| Duty, Btu/mole Syngas | 45,122 | 38,163 |
| Moles Feed $CO_2$/mol Syngas | 1.156 | 0.890 |
| Moles Feed NG/mole Syngas | 0.250 | 0.251 |
| Moles Effluent $CO_2$/mole Syngas | 0.782 | 0.515 |
| % $CO_2$ dry in Effluent | 43.9 | 33.9 |
| [K3 op/K3 eq] min, Boudouard | 1.13 | 1.43 |

The combination of parameters used in the conventional technology fall within the range disclosed in the GB 2,170, 508 (17–290 psia reformer pressure, $H_2/CO$ 0.3–2.3, $CO_2/C$ 0.3–5.0, S/C "about" 0–5). GB 2,170,508 teaches the production of extremely low $H_2/CO$ ratio syngas (down to 0.3). Carbon formation is not specifically addressed, hence it must be assumed that conditions outside of conventional technology are not practicable. As shown in this example, Intermediate $CO_2$ Injection shows a lower ratio of $CO_2/C$ and S/C compared to the conventional technology. This translates into lower amounts of carbon dioxide that needs to be stripped off and a lower steam requirement using the Intermediate $CO_2$ Injection technology of this invention.

Although illustrated and described herein with reference to certain conditions and compositions, the claims are not intended to be limited to the details shown. Instead, the claims should be read to include various modifications of the details shown without departing from the spirit of the invention.

What is claimed is:

1. A process for producing a hydrogen/carbon monoxide synthesis gas by hydrocarbon steam reforming comprising the steps of:
    a) introducing into an inlet of a fired tubular reformer a heated first reactant stream comprising hydrocarbon and steam, said first reactant stream containing less than 100 ppb total sulfur;
    b) introducing a heated second reactant stream into a reaction zone of said fired tubular reformer at a location between said inlet and an outlet of said fired tubular reactor wherein said second reactant stream comprises carbon dioxide; carbon dioxide and hydrocarbon; carbon dioxide and steam; hydrocarbon and steam; or carbon dioxide, hydrocarbon, and steam;
    c) removing an effluent comprising hydrogen, methane, carbon monoxide, carbon dioxide, and steam, said effluent having a hydrogen to carbon monoxide ratio ranging from about 0.6 to less than 3;

wherein optionally all or part of said hydrocarbon and steam in a) and b) is preformed.

2. The process of claim 1 wherein said first reactant stream is obtained, in part, by prereforming a desulfurized hydrocarbon selected from the group consisting of natural gas, associated gas, and naphtha.

3. The process according to claim 1 wherein said second reactant stream comprises carbon dioxide.

4. The process according to claim 3 wherein said second reactant stream is heated to 788 to 900° C.

5. The process according to claim 1 wherein said second reactant stream comprises carbon dioxide and steam.

6. The process according to claim 1 wherein said second reactant stream comprises steam and hydrocarbon with a steam to carbon ratio lower than the steam to carbon ratio in said first reactant stream.

7. The process according to claim 1 wherein said second reactant stream comprises hydrocarbon, carbon dioxide, and steam.

8. The process according to claim 1 wherein said second reactant stream is heated to at least about 788° C.

9. The process according to claim 1 wherein said second reactant stream is obtained, in part, by prereforming a desulfurized hydrocarbon with steam.

10. The process according to claim 1 wherein the quantity of reactants in said second reactant stream is adjusted to produce a ratio of hydrogen to carbon monoxide of 1 or less in the effluent.

11. The process according to claim 1 further including the step:
    (d) recovering hydrogen, carbon dioxide, and carbon monoxide from said effluent.

12. The process according to claim 1 wherein said effluent has a temperature of 816° C. or higher.

13. The process according to claim 1 wherein the steam to carbon ratio in step (a) ranges from 1 to 2.

14. The process according to claim 1 wherein the hydrogen to carbon monoxide ratio in said effluent gas ranges from 0.6 to 1.

\* \* \* \* \*